United States Patent
Sasage et al.

(10) Patent No.: US 6,811,605 B2
(45) Date of Patent: Nov. 2, 2004

(54) ADMIXTURE AND EXTRUDABLE HYDRAULIC COMPOSITION

(75) Inventors: Yoshiaki Sasage, Niigata-ken (JP); Tsutomu Yamakawa, Niigata-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/384,691

(22) Filed: Mar. 11, 2003

(65) Prior Publication Data

US 2003/0167975 A1 Sep. 11, 2003

(30) Foreign Application Priority Data

Mar. 11, 2002 (JP) ........................................ 2002-065266

(51) Int. Cl.$^7$ .............................................. C04B 16/02
(52) U.S. Cl. ..................... 106/805; 106/172.1; 106/730
(58) Field of Search .............................. 106/172.1, 730, 106/805, 729

(56) References Cited

U.S. PATENT DOCUMENTS 3,652,539 A * 3/1972 Miura et al. ................. 536/85
5,500,124 A * 3/1996 Wallisch et al. ............ 210/651

FOREIGN PATENT DOCUMENTS

| JP | 48-4580 A | * | 1/1973 |
| JP | 48-4581 A | * | 1/1973 |
| JP | 50-38782 A | * | 4/1975 |
| JP | 54-145779 A | * | 11/1979 |
| JP | 59-75902 A | * | 4/1984 |
| JP | 60-239348 A | | 11/1985 |
| JP | 01-165601 A | * | 6/1989 |
| JP | 1-305838 A | | 12/1989 |
| JP | 08-245701 A | * | 9/1996 |

* cited by examiner

Primary Examiner—Anthony J. Green
(74) Attorney, Agent, or Firm—Birch, Stewart, Kolasch & Birch, LLP

(57) ABSTRACT

An admixture comprising a nonionic water-soluble cellulose ether having a transparency of 35–89% in a 2 wt % aqueous solution at 20° C. is suited for hydraulic compositions. The hydraulic composition comprising the admixture and a less amount of pulp fibers is extrudable into a hardened part having a satisfactory flexural strength and surface smoothness.

11 Claims, No Drawings

ADMIXTURE AND EXTRUDABLE HYDRAULIC COMPOSITION

TECHNICAL FIELD

This invention relates to admixtures for use in extrudable hydraulic compositions, and extrudable hydraulic compositions which are extrudable into hardened parts having a satisfactory strength and surface smoothness.

BACKGROUND OF THE INVENTION

In traditional hydraulic compositions for extrusion molding, asbestos were used as additive fibers for facilitating extrusion into hardened parts having surface smoothness. In the recent years, the amount of asbestos used drastically decreased due to health considerations and legal regulations. At present, pulp fibers are often used as the substitute. In unison with this tendency, nonionic water-soluble cellulose ether is commonly used for the purposes of improving the dispersion of pulp fibers, enhancing strength properties and facilitating extrusion.

As the avoidance of asbestos is in progress, the amount of pulp fibers used is increasing. From the fire resistant standpoint, pulp fibers should be used in a minimum amount sufficient to provide necessary shape retention and flexural strength. Since flexural strength is preferential in most cases, the amount of pulp fibers used is in excess of the necessity to provide shape retention. Additionally the increased amount of pulp fibers undesirably detracts from the surface smoothness of hardened parts.

SUMMARY OF THE INVENTION

An object of the present invention is to provide an admixture for use in extrudable hydraulic compositions, which permits the hydraulic composition containing a less amount of pulp fibers to be extruded into hardened parts having necessary flexural strength and satisfactory surface smoothness; and an extrudable hydraulic composition comprising the admixture.

The inventor has found that when a nonionic water-soluble cellulose ether having a transparency of 35 to 89% in a 2 wt % aqueous solution at 20° C. is added as an admixture to a hydraulic composition containing a less amount of pulp fibers, the resulting hydraulic composition is extrudable into hardened parts having flexural strength and satisfactory surface smoothness.

Accordingly, the invention provides an admixture for extrudable hydraulic compositions, comprising a nonionic water-soluble cellulose ether having a transparency of 35 to 89% in a 2 wt % aqueous solution at 20° C.; and an extrudable hydraulic composition comprising the admixture.

DETAILED DESCRIPTION OF THE INVENTION

The admixture of the invention for extrudable hydraulic compositions is defined as comprising a nonionic water-soluble cellulose ether having a transparency of 35 to 89% in a 2 wt % aqueous solution at 20° C.

The nonionic water-soluble cellulose ethers which can be used herein include alkyl celluloses, hydroxyalkyl celluloses, and hydroxyalkyl alkyl celluloses. Illustrative examples include, but are not limited to, methyl cellulose, ethyl cellulose, hydroxyethyl cellulose, hydroxypropyl cellulose, hydroxyethyl methyl cellulose, hydroxyethyl ethyl cellulose and hydroxypropyl methyl cellulose.

A 2 wt % aqueous solution at 20° C. of the nonionic water-soluble cellulose ether should have a transparency of 35 to 89%, and preferably 50 to 89%. The "transparency" as used herein means, on the assumption that the light transmittance of pure water as measured by a photoelectric colorimeter is 100%, the light transmittance of the nonionic water-soluble cellulose ether solution as measured under the same conditions. The nonionic water-soluble cellulose ether having a transparency within the range is obtainable by properly adjusting disproportionation reaction of an etherifying agent.

The transparency is an index indicating a proportion of nonionic water-soluble cellulose ether that has been dissolved in water. For example, a high transparency means that a more proportion of nonionic water-soluble cellulose ether has been dissolved in water. In the molecule of nonionic water-soluble cellulose ether, hydroxyl groups on glucose rings are substituted with methoxyl, ethoxyl, hydroxyethoxyl, hydroxypropoxyl or similar groups, whereby the hydrogen bond between glucose rings is disrupted. As a result, hydration occurs so that the cellulose ether becomes soluble in water. If there are some portions which are not substituted at all or which have an extremely low degree of substitution, only these portions are not dissolved in water and exist in water while keeping the fibrous form. These portions act as if they were pulp fibers, and at the same time, have some water retention ability. This permits the amount of pulp fibers to be reduced. Those portions which are dissolved in water have an ordinary solubility and play the role of imparting plasticity necessary for extrusion and endowing the admixture with a water retention ability to prevent the components from separating during the extrusion step.

If the transparency of nonionic water-soluble cellulose ether is less than 35%, there are contained a less amount of thickening portions, with a likelihood of allowing material separation to occur or failing to impart plasticity necessary for extrusion. If the transparency is more than 89%, there are contained a less amount of portions acting as fibers, with a likelihood of failing to reduce the amount of pulp fibers added.

Preferably, the nonionic water-soluble cellulose ether has an aerated bulk density of 0.2 to 0.65 $g/cm^3$.

Further, the nonionic water-soluble cellulose ether has a viscosity of 1,000 to 50,000 mPa·s, preferably 1,500 to 50,000 mPa·s, more preferably 3,000 to 50,000 mPa·s, as measured in a 1 wt % aqueous solution at 20° C. by a Brookfield viscometer at 12 rpm.

On use, the admixture of the invention comprising the nonionic water-soluble cellulose ether, especially consisting of the nonionic water-soluble cellulose ether alone or as a mixture of two or more is added to an extrudable hydraulic composition. The amount of the admixture added (the total amount of nonionic water-soluble cellulose ethers) is an amount necessary to permit the hydraulic composition to be extruded, usually 0.1 to 2.0% by weight based on the entire components of the extrudable hydraulic composition excluding water, preferably 0.2 to 2.0% by weight and more preferably 0.2 to 1.5% by weight.

If necessary, another water-soluble polymer may be used along with the admixture of the invention for extrudable hydraulic compositions. Examples of other water-soluble polymers include partially saponified polyvinyl alcohol, modified starch, polyethylene oxide, wellan gum, and polyacrylamide.

The extrudable hydraulic composition of the invention contains the admixture defined above as well as conventional components such as hydraulic substances, aggregates, lightweight aggregates, and reinforcing fibers.

The hydraulic substances that harden in the presence of water include cement and gypsum. Cements include ordinary Portland cement, early-strength cement, blast furnace slag cement, fly-ash cement and alumina cement. Gypsum-based hydraulic substances include primarily the dihydrate, hemihydrate and anhydride forms of gypsum. The content of cement or gypsum-based hydraulic substances is not critical and may be set as needed to achieve the required strength.

Powdered silica and fly ash are typical aggregates. Besides, lightweight aggregates are used when weight reduction is desired, and include perlite, hollow microspheres, and styrene beads. Whether the aggregate is ordinary or lightweight, it is combined with the hydraulic substance so that the desired properties are achievable. The hydraulic substance and the aggregate are used in a weight ratio of from 10:90 to 100:0.

Reinforcing fibers are also useful in the hydraulic compositions. At present, pulp fibers that eliminate a concern about carcinogenicity become a substitute for asbestos and are widely used. In the practice of the invention, pulp fibers are advantageously used. Pulp fibers include fibers of virgin pulp, recycled paper pulp, and pulps originating from conifer and broadleaf woods, having an average length of about 200 to 2,000 $\mu$m. Polypropylene, vinylon and acrylic fibers are also useful. From the fire resistance and other standpoints, fibers are preferably used in amounts of 1 to 10 parts by weight provided that the total of the entire components of the hydraulic composition excluding water is 100 parts by weight.

If necessary, setting accelerators and retarders, and surface active agents such as water-reducing agents and dispersing agents are used. These agents are effective for managing the physical properties of a fresh hydraulic composition immediately after mixing of components with water. Any agent meeting a particular purpose may be added in a conventional amount.

To the hydraulic composition of the invention, water is added. The amount of water is conventional though it is determined in accordance with the type of hydraulic composition or the like. Water is preferably used in amounts of 20 to 80 parts by weight provided that the total of the entire components of the hydraulic composition excluding water is 100 parts by weight.

The hydraulic composition of the invention is obtainable by mixing the aforementioned components in a conventional manner. The hydraulic composition thus obtained is formed and hardened into a hardened body by an extrusion molding or suitable method.

EXAMPLES

Examples of the invention and comparative examples are provided to illustrate the invention, and are not intended to limit the scope thereof.

Examples 1–3 and Comparative Examples 1–3

Extrudable cement-based compositions formulated as shown in Tables 2 and 3 below were prepared from the following materials.
(1) Cement: ordinary Portland cement
(2) Silica: sifted powdered silica
(3) Pulp: virgin pulp having an average fiber length of 0.8 mm
(4) Perlite: average particle size 0.8 mm
(5) Water-soluble cellulose ether: Five samples of hydroxyethyl methyl cellulose (HEMC) or hydroxypropyl methyl cellulose (HPMC) having different transparency were furnished. The transparency and viscosity of these samples are shown in Table 1.

The transparency of a nonionic water-soluble cellulose ether was measured by weighing amounts of the cellulose ether and hot water so as to give a concentration of 2% by weight, and adding the cellulose ether to the hot water in a beaker with stirring. After 10 minutes of stirring, the beaker was immersed in cold water at 5° C. and stirring was continued for a further 2 hours in this condition. Thereafter, the beaker was placed in a thermostat chamber at 20° C. After it was confirmed that the temperature of the solution reached 20° C., a light transmittance was measured using a photoelectric colorimeter PC-50 (Hexa Science K.K.). The transparency is computed as the light transmittance of the nonionic water-soluble cellulose ether solution divided by the light transmittance of pure water which is 100.

TABLE 1

Transparency and viscosity of water-soluble cellulose ether

| Sample No. | Type | Transparency (%) | Viscosity of 1 wt % aqueous solution (mPa · s) |
|---|---|---|---|
| 1 | HEMC | 29 | 4,500 |
| 2 | HEMC | 53 | 4,380 |
| 3 | HPMC | 87 | 4,520 |
| 4 | HEMC | 89 | 5,600 |
| 5 | HPMC | 93 | 5,480 |

The above materials other than water were mixed for 3 minutes in a Henschel mixer, and the prescribed amount of water was added. Immediately thereafter, the mixture was worked 4 minutes in a 10-liter kneader-extruder, then extruded in vacuum. The parts extruded through a die of 6×75 mm profile were examined for extrudability and surface smoothness, and the parts extruded through a die of 40 mm wide and 20 mm thick profile were measured for flexural strength. The parts were sealed immediately after extrusion, primarily cured at 60° C. for 15 hours and then cured in an autoclave at 170° C. and RH 100% for 8 hours. The test results of extrudability, surface smoothness and flexural strength are shown in Tables 2 and 3.

The evaluation criteria of these tests are shown below.
(1) Extrudability: visually observed
   ○: no meander nor breakage
   X: meander or breakage
(2) Surface smoothness: visual observation and hand feel
   ○: no apparent asperities, not rough to the feel
   Δ: few apparent asperities, but rough to the feel
   X: apparent asperities
(3) Flexural strength
   The flexural strength of a specimen dimensioned 20 mm×40 mm×160 mm was measured according to JIS A6916 with a span of 75 mm.

TABLE 2

|  | Example 1 | Example 2 | Example 3 |
|---|---|---|---|
| Materials (pbw) | | | |
| Cement | 45 | 45 | 45 |
| Silica powder | 31.5 | 31.5 | 31.5 |

TABLE 2-continued

|  | Example 1 | Example 2 | Example 3 |
|---|---|---|---|
| Pulp | 3.5 | 3.5 | 3.5 |
| Perlite | 20 | 20 | 20 |
| Cellulose ether | No. 2 | No. 3 | No. 4 |
| Cellulose ether amount | 1.4 | 1.4 | 1.3 |
| Water | 47 | 47 | 47 |
| Extrudability | ◯ | ◯ | ◯ |
| Results |  |  |  |
| Surface smoothness | ◯ | ◯ | ◯ |
| Flexural strength (N/mm$^2$) | 15.7 | 15.8 | 15.6 |

TABLE 3

|  | Comparative Example 1 | Comparative Example 2 | Comparative Example 3 |
|---|---|---|---|
| Materials (pbw) |  |  |  |
| Cement | 45 | 45 | 45 |
| Silica powder | 31.5 | 31.5 | 30 |
| Pulp | 3.5 | 3.5 | 5 |
| Perlite | 20 | 20 | 20 |
| Cellulose ether | No. 1 | No. 5 | No. 5 |
| Cellulose ether amount | 1.4 | 1.3 | 1.4 |
| Water | 45 | 45 | 47 |
| Extrudability | X | ◯ | ◯ |
| Results |  |  |  |
| Surface smoothness | — | ◯ | X |
| Flexural strength (N/mm$^2$) | — | 12.8 | 15.5 |

As is evident from Tables 2 and 3, the hydraulic compositions of Examples, despite the reduced amount of pulp added, are effectively extrudable into hardened products having improved surface smoothness and flexural strength. In contrast, the hydraulic composition of Comparative Example 1 is difficult to extrude because the cellulose ether used has too low a transparency and contains less of thickening portions. The hydraulic composition of Comparative Example 2 is low in flexural strength because the cellulose ether used contains less of insoluble portions acting as fibers. In Comparative Example 3, the amount of pulp added is increased to achieve a high flexural strength at the sacrifice of surface smoothness.

There has been described an admixture which is added to a hydraulic composition containing a less amount of pulp fibers, permitting the composition to be extruded into hardened parts having flexural strength and surface smoothness.

Japanese Patent Application No. 2002-065266 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. An extrudable hydraulic composition comprising:

a nonionic water-soluble cellulose ether having a transparency of 35 to 89% in a 2 wt % aqueous solution at 20° C.;

a hydraulic substance;

reinforcing fibers; and water.

2. The composition of claim 1 wherein the cellulose ether is an alkyl cellulose, hydroxyalkyl cellulose or hydroxyalkyl alkyl cellulose.

3. The composition of claim 1 wherein the cellulose ether has a transparency measured at 20° C. in a 2 wt % aqueous solution of 50 to 89%.

4. The composition of claim 1 wherein the cellulose ether has an aerated bulk density of 0.2 to 0.65 g/cm$^3$.

5. The composition of claim 1 wherein the cellulose ether has a viscosity of 1,000 to 50,000 mPa·s, as measured in a 1 wt % aqueous solution at 20° C. by a Brookfield viscometer at 12 rpm.

6. The composition of claim 1 wherein the composition further comprises water-soluble polymers in addition to the cellulose ether.

7. The composition of claim 1 wherein the composition further comprises one or more members selected from the group consisting of: partially saponified polyvinyl alcohol, modified starch, polyethylene oxide, wellan gum, and polyacrylamide.

8. The composition of claim 1 wherein the hydraulic substance is gypsum.

9. The composition of claim 1 wherein the hydraulic substance is cement.

10. The composition of claim 1 wherein the hydraulic substance is Portland cement.

11. The composition of claim 1 wherein the reinforcing fibers are selected from the group consisting of those of wood, polypropylene, vinylon, and acrylic.

\* \* \* \* \*